United States Patent
Wang et al.

(10) Patent No.: US 11,823,381 B2
(45) Date of Patent: Nov. 21, 2023

(54) KNOWLEDGE DISTILLATION WITH ADAPTIVE ASYMMETRIC LABEL SHARPENING FOR SEMI-SUPERVISED FRACTURE DETECTION IN CHEST X-RAYS

(71) Applicant: Ping An Technology (Shenzhen) Co., Ltd., Shenzhen (CN)

(72) Inventors: Yirui Wang, Bethesda, MD (US); Kang Zheng, Bethesda, MD (US); Xiaoyun Zhou, Bethesda, MD (US); Le Lu, Bethesda, MD (US); Shun Miao, Bethesda, MD (US)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 397 days.

(21) Appl. No.: 17/214,400

(22) Filed: Mar. 26, 2021

(65) Prior Publication Data
US 2022/0207718 A1   Jun. 30, 2022

Related U.S. Application Data

(60) Provisional application No. 63/130,838, filed on Dec. 27, 2020.

(51) Int. Cl.
*G06T 7/00* (2017.01)
*G06N 3/08* (2023.01)
(Continued)

(52) U.S. Cl.
CPC ........ *G06T 7/0012* (2013.01); *G06F 18/2155* (2023.01); *G06N 3/084* (2013.01);
(Continued)

(58) Field of Classification Search
CPC . G06T 7/0012; G06T 7/10; G06T 7/11; G06T 7/12; G06T 7/13; G06T 9/00;
(Continued)

(56) References Cited

U.S. PATENT DOCUMENTS

| | | | | |
|---|---|---|---|---|
| 10,430,946 | B1 * | 10/2019 | Zhou | G06N 3/047 |
| 2019/0287515 | A1 * | 9/2019 | Li | G06N 3/084 |
| 2020/0334538 | A1 * | 10/2020 | Meng | G10L 15/16 |

OTHER PUBLICATIONS

Huang YJ, Liu W, Wang X, Fang Q, Wang R, Wang Y, Chen H, Chen H, Meng D, Wang L. Rectifying supporting regions with mixed and active supervision for rib fracture recognition. IEEE Transactions on Medical Imaging. Jun. 30, 2020;39(12):3843-54. (Year: 2020).*

(Continued)

*Primary Examiner* — Bobbak Safaipour
*Assistant Examiner* — Duy Tran
(74) *Attorney, Agent, or Firm* — ANOVA LAW GROUP, PLLC

(57) ABSTRACT

Knowledge distillation method for fracture detection includes obtaining medical images including region-level labeled images, image-level diagnostic positive images, and image-level diagnostic negative images, in chest X-rays; performing a supervised pre-training process on the region-level labeled images and the image-level diagnostic negative images to train a neural network to generate pre-trained weights; and performing a semi-supervised training process on the image-level diagnostic positive images using the pre-trained weights. A teacher model is employed to produce pseudo ground-truths (GTs) on the image-level diagnostic positive images for supervising training of a student model, and the pseudo GTs are processed by an adaptive asymmetric label sharpening (AALS) operator to produce sharpened pseudo GTs to provide positive detection responses on the image-level diagnostic positive images.

17 Claims, 5 Drawing Sheets

(51) Int. Cl.
*G06K 9/62* (2022.01)
*G06N 3/084* (2023.01)
*G06F 18/214* (2023.01)

(52) U.S. Cl.
CPC ............... *G06T 2207/10116* (2013.01); *G06T 2207/20081* (2013.01)

(58) Field of Classification Search
CPC ..................... G06T 9/002; G06T 7/174; G06T 2207/10116; G06T 2207/10072; G06T 2207/20084; G06T 2207/20081; G06T 2207/20128; G06T 2207/30; G06T 2207/30008; G06T 2207/30061; G06T 2210/12; G06T 2219/004; G06T 2207/20021; G06F 18/2155; G06F 18/00; G06F 18/25; G06F 18/214; G06N 3/084; G06N 3/08; G06N 3/0895; G06N 3/09; G06N 3/091; G06N 3/092; G06N 3/094; G06N 3/096; G06N 3/098; G06N 3/0985
See application file for complete search history.

(56) References Cited

OTHER PUBLICATIONS

Chen H, Lagadec B, Bremond F. Enhancing Diversity in Teacher-Student Networks via Asymmetric branches for Unsupervised Person Re-identification. arXiv preprint arXiv:2011.13776. Nov. 27, 2020. (Year: 2020).*

Liu Q, Yu L, Luo L, Dou Q, Heng PA. Semi-supervised medical image classification with relation-driven self-ensembling model. IEEE transactions on medical imaging. May 18, 2020;39(11):3429-40. (Year: 2020).*

* cited by examiner

KNOWLEDGE DISTILLATION WITH ADAPTIVE ASYMMETRIC LABEL SHARPENING FOR SEMI-SUPERVISED FRACTURE DETECTION IN CHEST X-RAYS

CROSS-REFERENCE TO RELATED APPLICATION

This application claims the priority of U. S. Provisional Patent Application No. 63/130,838, filed on Dec. 27, 2020, the entire content of which is incorporated herein by reference.

FIELD OF THE TECHNOLOGY

This application relates to the field of knowledge distillation for medical images and, more particularly, relates to method, electronic device, and computer program product for knowledge distillation method for fracture detection in chest x-rays.

BACKGROUND OF THE DISCLOSURE

Computer-aided diagnosis (CAD) of medical images has been extensively studied in the past decade. In recent years, substantial progress has been made in developing deep learning-based CAD systems to diagnose a wide range of pathologies. The state-of-the-art CAD solutions are typically developed based on large-scale expert annotations. However, the labor cost of large-scale annotations in medical area is prohibitively high due to the required medical expertise, which hinders the development of deep learning-based CAD solutions for applications where such large-scale annotations are not yet available.

SUMMARY

One aspect of the present disclosure provides a knowledge distillation method for fracture detection. The knowledge distillation method includes obtaining medical images including region-level labeled images, image-level diagnostic positive images, and image-level diagnostic negative images, in chest X-rays; performing a supervised pre-training process on the region-level labeled images and the image-level diagnostic negative images to train a neural network to generate pre-trained weights; and performing a semi-supervised training process on the image-level diagnostic positive images using the pre-trained weights. A teacher model is employed to produce pseudo ground-truths (GTs) on the image-level diagnostic positive images for supervising training of a student model, and the pseudo GTs are processed by an adaptive asymmetric label sharpening (AALS) operator to produce sharpened pseudo GTs to provide positive detection responses on the image-level diagnostic positive images.

Another aspect of the present disclosure provides an electronic device. The electronic device includes a memory, containing computer program stored thereon; and a processor, coupled with the memory and, when the computer program being executed, configured to: obtain medical images including region-level labeled images, image-level diagnostic positive images, and image-level diagnostic negative images, in chest X-rays; perform a supervised pre-training process on the region-level labeled images and the image-level diagnostic negative images to train a neural network to generate pre-trained weights; and perform a semi-supervised training process on the image-level diagnostic positive images using the pre-trained weights. A teacher model is employed to produce pseudo ground-truths (GTs) on the image-level diagnostic positive images for supervising training of a student model, and the pseudo GTs are processed by an adaptive asymmetric label sharpening (AALS) operator to produce sharpened pseudo GTs to provide positive detection responses on the image-level diagnostic positive images.

Another aspect of the present disclosure provides a computer program product. The computer program product includes a non-transitory computer-readable storage medium and program instructions stored therein. The program instructions are configured to be executable by a computer to cause the computer to implement operations including: obtaining medical images including region-level labeled images, image-level diagnostic positive images, and image-level diagnostic negative images, in chest X-rays; performing a supervised pre-training process on the region-level labeled images and the image-level diagnostic negative images to train a neural network to generate pre-trained weights; and performing a semi-supervised training process on the image-level diagnostic positive images using the pre-trained weights. A teacher model is employed to produce pseudo ground-truths (GTs) on the image-level diagnostic positive images for supervising training of a student model, and the pseudo GTs are processed by an adaptive asymmetric label sharpening (AALS) operator to produce sharpened pseudo GTs to provide positive detection responses on the image-level diagnostic positive images.

Other aspects of the present disclosure can be understood by those skilled in the art in light of the description, the claims, and the drawings of the present disclosure.

DETAILED DESCRIPTION

The following describes the technical solutions in the embodiments of the present invention with reference to the accompanying drawings. Wherever possible, the same reference numbers will be used throughout the drawings to refer to the same or like parts. Apparently, the described embodiments are merely some but not all the embodiments of the present invention. Other embodiments obtained by a person skilled in the art based on the embodiments of the present invention without creative efforts shall fall within the protection scope of the present disclosure. Certain terms used in this disclosure are first explained in the followings.

Various embodiments provide method, electronic device, and computer program product of a knowledge distillation method for fracture detection. For example, a knowledge distillation method may be performed with adaptive asymmetric label sharpening (AALS) for semi-supervised fracture detection in chest x-rays (CXRs). A reliable, robust and accurate fracture detection model may thus be provided for CXRs using limited expert annotations and abundant clinical diagnosis records.

In one embodiment, image-level CXRs (e.g., labeled/non-labeled) and region-level labeled CXRs may be used to develop a fracture detection model, to identify classification and localization of fractures (including e.g., rib and clavicle fractures, and spine bone fractures) based on CXRs.

As used herein, the term "chest x-rays" or CXRs may refer to x-ray imaging results and/or x-ray examinations, that are related to chest, including ribs, clavicle, and/or spine bones, etc.

Image-level labels may be obtained efficiently at a large scale, e.g., by mining a hospital's image archive and clinical records. In one example, image-level labels may be obtained by finding matching diagnosis code and/or keyword in the clinical records. The image-level labels may include positive labels (e.g., for positive diagnosis) and negative labels (e.g., for negative diagnosis).

Region-level labels may be manually annotated by experts and are more costly to obtain. For example, image-level diagnostic positive CXRs may be annotated by experts to provide region-level labels, e.g., in a form of bounding-box.

Figure 1:
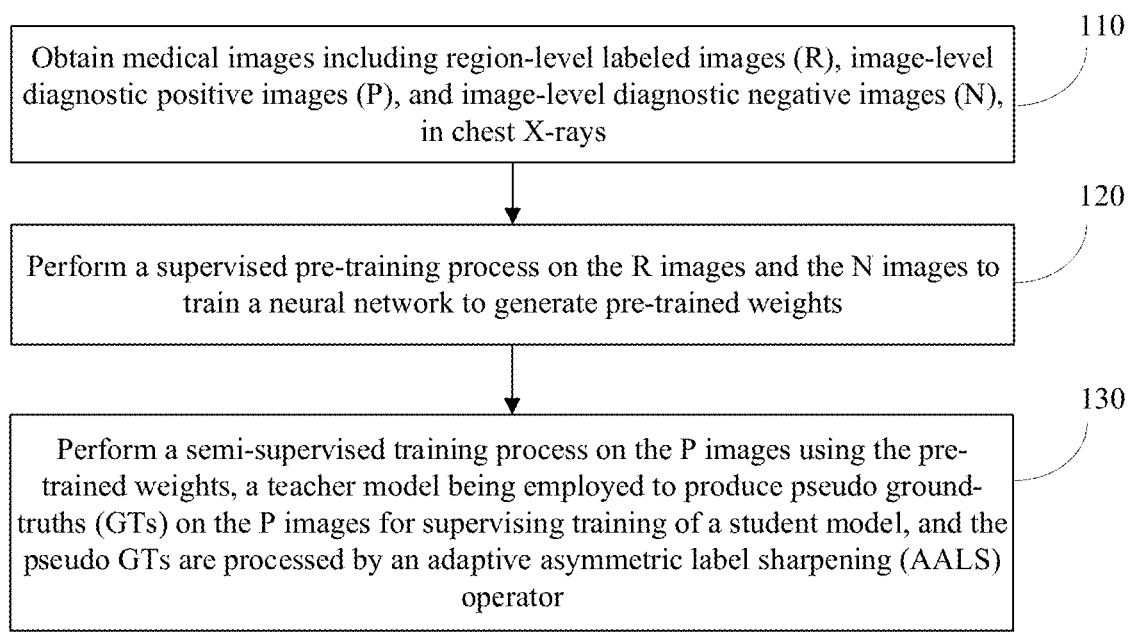
FIG. 1 illustrates an example knowledge distillation method for fracture detection according to various embodiments of the present disclosure.
Figure 2:
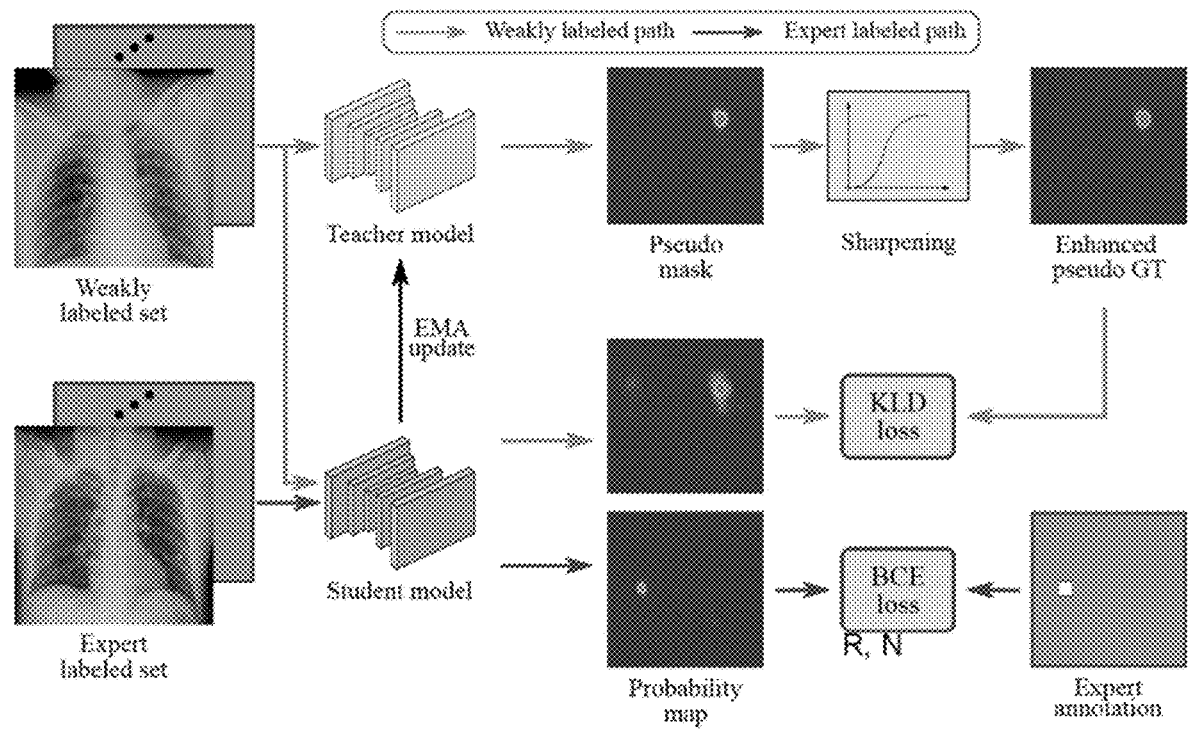
FIG. 2 illustrates another example knowledge distillation method for fracture detection according to various embodiments of the present disclosure.

FIG. 1 illustrates an example knowledge distillation method for fracture detection according to various embodiments of the present disclosure. FIG. 2 illustrate another example of knowledge distillation method for fracture detection according to various embodiments of the present disclosure.

At 110 of FIG. 1, medical images, including region-level labeled images (R), image-level diagnostic positive images (P), and image-level diagnostic negative images (N), of CXRs, are obtained.

In an exemplary implementation, a large quantity of CXRs (e.g., about 65,845 CXRs) may be obtained based on a trauma registry of a medical center. By matching diagnosis code and keyword among the clinical records, CXRs with image-level positive diagnosis labels and image-level negative diagnosis labels may be identified (e.g., including 6,792 positive CXRs and 59,051 negative CXRs). Among CXRs with image-level positive diagnosis labels, a number of CXRs may be annotated by experts to provide region-level labels in the form of bounding-boxes.

The disclosed method, device, and/or product may effectively exploit CXRs with both the region-level labels and the image-level labels under extremely imbalanced positive/negative ratio.

In some embodiments, a neural network may be trained to produce a probability map that indicates the location of the detected fractures. Since the shape and scale of fractures can vary significantly, feature pyramid network (FPN) with a ResNet-50 backbone may be employed to tackle the scale variation challenge by fusing multi-scale features. In some embodiments, the training at least includes: a supervised pre-training process and a semi-supervised training process. In the pre-training process, a fracture detection model is trained via supervised learning using the region-level labeled images (R) and the image-level diagnostic negative images (N). In the semi-supervised training process, image-level diagnostic positive images (P) are further exploited to facilitate the disclosed training.

At 120 of FIG. 1, a supervised pre-training process is performed on the region-level labeled images (R) and the image-level diagnostic negative images (N) to train a neural network (e.g., using a student model) to generate pre-trained weights.

The neural network may be trained using only region-level labeled images and image-level diagnostic negative images, where pixel-level supervision signals (or pixel-level supervisions) can be generated. In one embodiment, pixel-level supervision signals may be converted from the physician labeled bounding-boxes, e.g., by assigning pixels within bounding-boxes as "one" and "zero" elsewhere. For example, for region-level labeled images (R) in CXRs, ground-truths (GT) masks are generated by assigning "one" ("1") to the pixels within the bounding-boxes (e.g., as region-level labels) and assigning "zero" ("0") elsewhere. For the image-level diagnostic negative images (N) in CXRs, GT masks with all "zeros" are generated.

During training, a same supervised loss for the supervised pre-training process on the region-level labeled images (R) and the image-level diagnostic negative images (N) may be used. For example, pixel-wise binary cross-entropy (BCE) loss between the predicted probability map and the generated GT mask may be used for the training on both the region-level labeled images (R) and the image-level diagnostic negative images (N).

The BCE loss ($L_{sup}$) is shown as follows:

$$\mathcal{L}_{sup} = \sum_{x \in (R \cup N)} BCE(f_\theta(x), y) \quad (1)$$

where x denotes the region-level labeled images (R) or the image-level diagnostic negative images (N) in the chest x-rays, y denotes pixel-level supervision mask corresponding to X, and $f_\theta(x)$ denotes probability map output of the neural network parameterized by $\theta$.

In another example as shown in FIG. 2, the supervised pre-training process may be performed on "expert labeled set" including the region-level labeled images (R) and the image-level diagnostic negative images (N) to train the neural network using a student model based on the BCE loss (Lsup) between the predicted probability map and the GT mask generated based on expert annotation.

In the cases when there is extreme imbalance between the region-level labeled images (R) and the image-level diagnostic negative images (N), (e.g., 808 of R vs. 59,861 of N in one example), the pre-trained model may tend to have a low detection sensitivity, e.g., producing low probabilities on fracture sites. A semi-supervised training process may then be performed.

At 130 of FIG. 1, a semi-supervised training process is performed on the image-level diagnostic positive images (P). For example, a teacher-student paradigm, including a student model and a teacher model, may be employed. FIG. 2 also includes an example of a teacher-student paradigm according to various embodiments of the present disclosure.

For example, as shown in FIG. 2, the teacher model is employed to produce pseudo ground-truths (GTs) on the image-level diagnostic positive images (P) for supervising training of the student model. The student model learns from the pseudo GTs produced from the teacher model on the image-level diagnostic positive images (P). The teacher and student models share the same network architecture (including, e.g., ResNet-50 with feature pyramid network (FPN)), and are both initialized using the pre-trained weights obtained from the exemplary supervised learning step at 120 of FIG. 1.

In one embodiment, the student model is trained via back propagation and iteratively update the teacher model using the exponential moving average (EMA) of the student model weights during training, as also shown in FIG. 2.

The weights of the teacher model are updated as follows:

$$\theta'_t = \alpha \theta'_{t-1} + (1-\alpha)\theta_t \qquad (2)$$

where $\theta'_t$ and $\theta_t$ respectively denote weights of the teacher and student models at training step t, $\alpha$ is a smoothing coefficient to control the pace of knowledge update. For example, $\alpha$ may be set to be 0.999, as needed.

In various embodiments, CXRs of the region-level labeled set (R), image-level labeled positive set (P), and image-level labeled negative set (N) may all be used to train the teacher-student model.

Referring back to 130 of FIG. 1, in the semi-supervised training process, the pseudo ground-truths (GTs) or a pseudo GT map, produced by employing the teacher model on the image-level diagnostic positive images (P), may be further processed in an adaptive asymmetric label sharpening (AALS) operator to preform an adaptive asymmetric label sharpening (AALS) process. Sharpened/enhanced pseudo GTs may thus be generated.

Sharpened pseudo GTs (y') of an image (x) is denoted as:

$$y' = S(f_{\theta'_t}(x)) \qquad (3)$$

where $f_{\theta'_t}$ denotes the teacher model at t-th step, $\theta'_t$ denotes weights of the teacher model at training step t, and $S(\cdot)$ denotes adaptive asymmetric label sharpening (AALS). KL divergence between the sharpened pseudo GTs (y') and the student model's prediction $f_{\theta_t}(x)$ is calculated as an additional loss $L_{semi}$ (or KLD loss):

$$\mathcal{L}_{semi} = \sum_{x=\mathcal{P}} KLDiv(S(f_{\theta'_t}(x)), f_{\theta_t}(x)) \qquad (4)$$

As such, the total loss used to train the student network includes:

$$\mathcal{L} = \mathcal{L}_{sup} + \mathcal{L}_{semi} \qquad (5)$$

In other knowledge distillation models, pseudo GTs are produced on unlabeled data to supervise the student model. Since no knowledge is given for the unlabeled data, the pseudo GTs are either directly used, or processed with symmetric softening or sharpening in other baseline models. In contract, the disclosed knowledge distillation method may be implemented, when: 1) image-level diagnostic positive images of CXRs contain visible fracture sites, and 2) due to the imbalanced positive/negative ratio, the pseudo GT tends to have low sensitivity (i.e., low probabilities at fracture sites).

Therefore, the maximum value of the pseudo GT map may be low. To enhance the student model's activation on fracture sites, AALS is employed:

$$y' = S(y) = expit(A \cdot logit(y) + (1-A) \cdot logit(T)) \qquad (6)$$

where $expit(\cdot)$ and $logit(\cdot)$ denote Sigmoid function and its inverse, A and T control the strength and center of the sharpening operator, respectively.

In one embodiment, the effects of A and T for controlling the sharpening of strength and center are shown in FIG. 2. As shown, after "sharpening," the "enhanced pseudo GT" has more enhanced strength and center as compared with the "pseudo mask."

The disclosed asymmetric sharpening (e.g., AALS) is used to enhance low probabilities in the pseudo GT, where T<0.5 may thus be used for the AALS process. In one example, T=0.4 may be selected to use.

In some cases, due to the imbalanced training data and because some fracture sites may still be missed in pseudo GT(y) (e.g., with low probability values), max (S(y), y) is used as label-sharpening function to avoid over penalization of the student model's activation on fracture sites with low probability values in the pseudo GT(y).

The sharpening strength A is dynamically selected based on the maximum probability in the pseudo GT map, written as:

$$A = A_0 - (A_0 - 1)y_{max} \qquad (7)$$

where $y_{max}$ is the maximum probability in the pseudo GT map, $A_0$ is a hyperparameter that controls the largest sharpening strength allowed. The sharpening strength A is negatively correlated with the maximum probability $y_{max}$. When $y_{max}$ approaches 1, A approaches to its minimum value 1, making $S(\cdot)$ an identity mapping. When $y_{max}$ decreases, A increases toward $A_0$, leading to stronger sharpening of the pseudo GT. A dynamic A is required because the sharpening operator is asymmetric. If a constant A>1 is used, the sharpening operation will always enlarge the activation area in the pseudo GT map, which drives the model to produce probability maps with overly large activation areas. With the adaptive sharpening strength, when a fracture site is confidently detected in a CXR (i.e., $y_{max}$ approaches 1), the sharpening operation degenerates to identity mapping to avoid consistently expanding the activation area.

As such, the present disclosure provides effective supervised learning solutions, for example, including a supervised pre-training process and a semi-supervised training process, to fully exploit the clinical diagnoses with imbalanced data distribution to effectively train a fracture detection model (e.g., CAD models). The disclosed method for fracture detection in CXR better accounts for the imbalanced data distribution and exploits the image-level labels of the unannotated data.

In addition, a teacher-student mechanism is disclosed herein, where a teacher model is employed to produce pseudo ground-truths (GTs) on the image-level diagnostic positive images for supervising the training of the student model. Different from other knowledge distillation methods where the pseudo GTs are directly used or processed with symmetric sharpening/softening, the disclosed adaptive asymmetric label sharpening (AALS) is used to account for the teacher model's low sensitivity caused by the imbalanced data distribution and to provide positive detection responses on the image-level diagnostic positive CXR images.

In various embodiments, the knowledge distillation method for fracture detection of the present disclosure may be applied to one or more electronic devices.

In various embodiments, the electronic device is capable of automatically performing numerical calculation and/or information processing according to an instruction configured or stored in advance, and hardware of the electronic device can include, but is not limited to, a microprocessor, an Application Specific Integrated Circuit (ASIC), a Field-Programmable Gate Array (FPGA), a Digital Signal Processor (DSP), and an embedded device, etc. The electronic device can be any electronic product that can interact with users, such as a personal computer, a tablet computer, a smart phone, a desktop computer, a notebook, a palmtop computer, a personal digital assistant (PDA), a game machine, an interactive network television (IPTV), and smart wearable devices, etc. The electronic device can perform human-computer interaction with a user through a keyboard, a mouse, a remote controller, a touch panel, or a voice control device. The electronic device can also include a network device and/or a user device. The network device can include, but is not limited to, a cloud server, a single network server, a server group composed of a plurality of network servers, or a cloud computing system composed of a plurality of hosts or network servers. The electronic device can be in a network. The network can include, but is not limited to, the Internet, a wide region network, a metropolitan region network, a local region network, a virtual private network (VPN), and the like.

Figure 3:
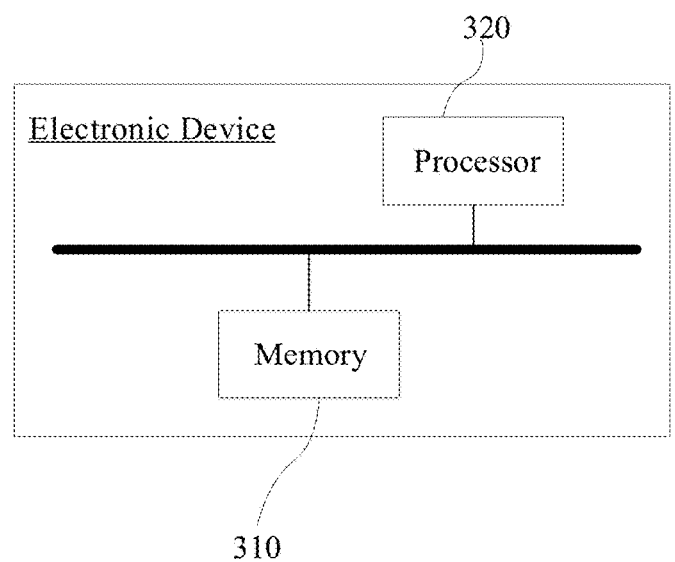
FIG. 3 illustrates an example electronic device for knowledge distillation for fracture detection according to various embodiments of the present disclosure.

FIG. 3 illustrates a structural diagram of an exemplary electronic device for performing the disclosed knowledge distillation method for fracture detection consistent with various embodiments of the present disclosure.

Referring to FIG. 3, the exemplary electronic device includes a memory 310 storing a computer program, and a processor 320 coupled to the memory 310 and configured, when the computer program being executed, to perform the disclosed knowledge distillation methods for fracture detection.

The memory 310 may include volatile memory such as random-access memory (RAM), and non-volatile memory such as flash memory, hard disk drive (HDD), or solid-state drive (SSD). The memory 310 may also include combinations of various above-described memories. The processor 320 may include a central processing unit (CPU), an embedded processor, a microcontroller, and a programmable device such as an application-specific integrated circuit (ASIC), a field programmable gate array (FPGA), and a programmable logic array (PLD), etc.

The present disclosure also provides a computer-readable storage medium storing a computer program. The computer program may be loaded to a computer or a processor of a programmable data processing device, such that the computer program is executed by the computer or the processor of the programmable data processing device to implement the disclosed method.

Various embodiments also provide a computer program product. The computer program product includes a non-transitory computer-readable storage medium and program instructions stored therein. The program instructions may be configured to be executable by a computer to cause the computer to implement operations including the disclosed knowledge distillation methods for fracture detection.

Example I

The disclosed knowledge distillation method for fracture detection was performed by an electronic device including a workstation. For example, the fracture detection model was performed on a workstation with a single Intel Xeon E5-2650 v4 CPU @2.2 GHz, 128 GB RAM, 4 NVIDIA Quadro RTX 8000 GPUs. All example methods were implemented in Python 3.6 and PyTorch v1.6. ImageNet pre-trained weights were used to initialize the backbone network of the student model. Adam optimizer was employed in all example methods. A learning rate of 4e-5, a weight decay of 0.0001 and a batch size of 48 were used to train the disclosed model for 25 epochs. All images were padded to square and resized to 1024×1024 for network training and inference. Rotation, horizontal flipping, intensity and contrast jittering were randomly performed to augment the training data. The trained model was evaluated on the validation set after every training epoch, and the one with the highest validation an area under receiver operating characteristic curve (AUROC) is selected as the best model for inference.

Example II

The disclosed method, electronic device and computer program product were evaluated on a real-world scenario dataset of all (N=65,843) CXR images taken in the trauma center of Chang Gung Memorial Hospital from year 2008 to year 2016.

Based on the clinical diagnosis records, the CXRs were assigned image-level labels for rib and clavicle fractures. Among the total 65,843 CXR images, 6,792 CXRs have diagnostic positive labels, labelled with at least one type of fracture, and 59,051 CXRs have diagnostic negative labels for both fracture types including rib and clavicle fractures. Among the 6,792 image-level diagnostic positive CXR images, 808 CXRs were randomly selected for expert annotation by two experienced trauma surgeons. The annotations were confirmed by the best available information, including the original CXR images, radiologist reports, clinical diagnoses, advanced imaging modality findings, etc. All experiments were conducted using five-fold cross-validation with a 70%/10%/20% for training, validation, and testing split, respectively.

Example III

Both fracture classification and localization performances were evaluated using the disclosed fraction detection model. The widely used classification metric AUROC (area under receiver operating characteristic curve) was used to assess classification performance. For object detection, the maximum classification score of all predicted bounding-boxes is taken as the classification score. For producing probability map, the maximum value of the probability map is taken as the classification score.

The fracture localization performance of different methods, including the disclosed example methods and other baseline methods, was also assessed. As disclosed, since only probability map may be produced, standard FROC (free-response receiver operating characteristic) metric based on bounding-box predictions was used. As used herein, a modified FROC metric was used to evaluate the localization performance of all compared methods including the disclosed example methods and other baseline methods.

A fracture site was considered as recalled if the center of the fracture site's bounding-box is activated. And the activated pixels outside bounding-boxes were regarded as false positives. Thus, the modified FROC measured the fracture recall and the average ratio of false positive pixels per image. To calculate the modified FROC for object detection methods, the predicted bounding-boxes were converted into a binary mask using different thresholds, with the pixels within the predicted box as positive, and the pixels outside the box as negative. To quantify the localization performance, an FROC score was calculated as an average of recalls at ten false positive ratios from 1% to 10%.

The disclosed example methods were compared with, other baseline methods in the following three categories including: 1) weakly-supervised methods: CheXNet, a representative state-of-the-art X-ray CAD method trained purely using image-level labels; 2) object detection methods: including an anchor-based detector RetinaNet and an anchor-free detector FCOS; and 3) semi-supervised methods: including II-Model, Temporal Ensemble and Mean Teacher, and a state-of-the-art medical image SSL method. For all evaluated methods, ResNet-50 was employed as the backbone network. FPN was employed in the two detection methods of RetinaNet and FCOS.

TABLE 1

| Method | Rib fracture | | Clavicle fracture | |
|---|---|---|---|---|
| | AUROC | FROC | AUROC | FROC |
| CheXNet | 0.8867 | — | 0.9555 | — |
| RetinaNet | 0.8609 | 0.4654 | 0.8610 | 0.7985 |
| FCOS | 0.8646 | 0.5684 | 0.8847 | 0.8471 |
| Li-Method | 0.8446 | — | 0.9560 | — |
| II-Model | 0.8880 | 0.7703 | 0.9193 | 0.8536 |
| Temporal Ensemble | 0.8924 | 0.7915 | 0.9132 | 0.8204 |
| Mean Teacher | 0.9155 | 0.8540 | 0.9474 | 0.8884 |
| Supervised pre-training | 0.9025 | 0.7267 | 0.9174 | 0.7967 |
| Present disclosure | 0.9318 | 0.8914 | 0.9646 | 0.9265 |
| | (+1.63%) | (+3.74%) | (+0.86%) | (+2.81%) |

Table 1 summarizes the quantitative results of all compared methods with the disclosed example method. FROC score is reported for localization performance. On the more challenging rib fracture detection task, Mean Teacher is the most competitive baseline method, measuring an AUROC of 0.9155 and an FROC score of 0.8540. The disclosed method measures an AUROC of 0.9318 and an FROC score of 0.8914, which significantly outperforms Mean Teacher by a 1.63% gap on the AUROC, and a 3.74% gap on the FROC score.

Experiments based on the disclosed method demonstrated that an area under receiver operating characteristic curve (AUROC) of 0.9318/0.9646 and a free-response receiver operating characteristic (FROC) score of 0.8914/0.9265 on the rib/clavicle fracture detection. Compared to other state-of-the-art baseline methods, the disclosed method significantly improves the AUROC by 1.63%/0.86% and the FROC by 3.74%/3.81% on rib/clavicle fracture detection, respectively.

Figure 7:
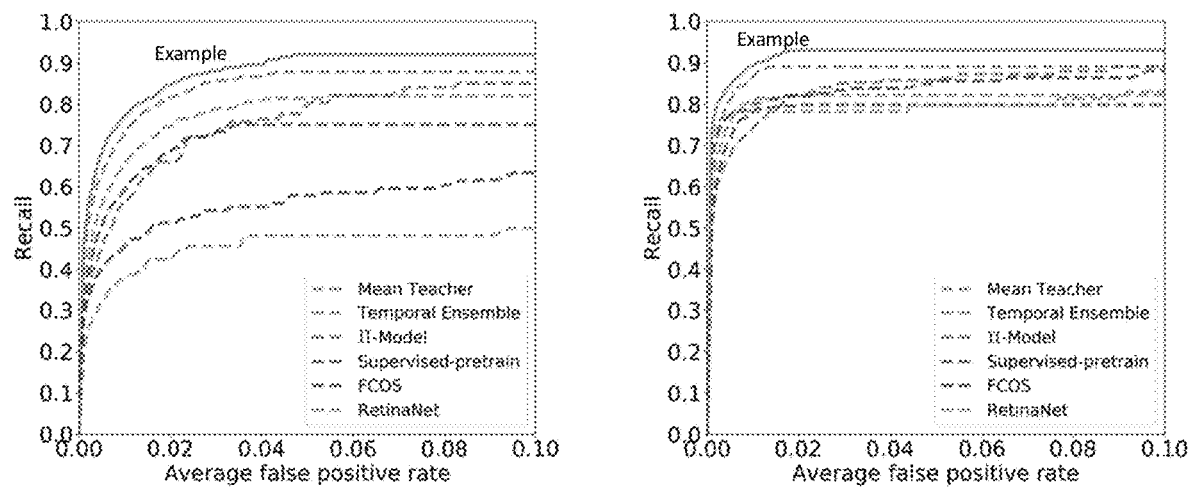
FIG. 7 illustrates FROC (free-response receiver operating characteristic) curves of rib fracture (left) and clavicle fracture (right) detection results using different methods according to various embodiments of the present disclosure.

FIG. 7 illustrates FROC curves of rib fracture (left) and clavicle fracture (right) detection results using different methods including the disclosed example method. On the easier clavicle fracture detection task, CheXNet and Li-method report the highest AUROCs (i.e., above 0.95) among the baseline methods. Mean Teacher delivers the strongest FROC score of 0.8884 among the baseline methods. The disclosed method also outperforms all baseline methods on the clavicle fracture detection task, reporting an AUROC of 0.9646 and an FROC of 0.9265. It was noted that the three knowledge distillation methods, II-Model, Temporal Ensemble and Mean Teacher, perform stronger than the supervised detection methods. The advantage is more significant on the easier clavicle fracture detection task. This is mainly because clavicle fractures have simpler geometric property and similar visual patterns, which knowledge distillation methods can effectively learn from the pseudo GT of unlabeled data. However, on the more complex rib fracture detection, the advantage of knowledge distillation methods is much less significant. Due to the complex visual patterns of rib fracture and the limited region-labeled positive data, the pseudo GT maps have a low sensitivity (i.e., the supervised pre-trained model reports a low FROC score of 0.7267), which limits the knowledge transferred to the distilled model. Using the AALS, the disclosed method effectively transfers more knowledge to the student model, hence achieving significantly improved performance compared to the other knowledge distillation methods.

CheXNet and Li-method were observed to significantly outperform other baseline knowledge distillation methods on the clavicle fracture AUROC metric, but no performance advantage is observed on the rib fracture AUROC. This is because CheXNet and Li-method specifically use the positive image-level label, while the baseline knowledge distillation methods do not. In particular, CheXNet is trained via weakly-supervised learning purely using image-level labels and Li-method exploits image-level positive labels in a multi-instance learning manner.

Figure 6:
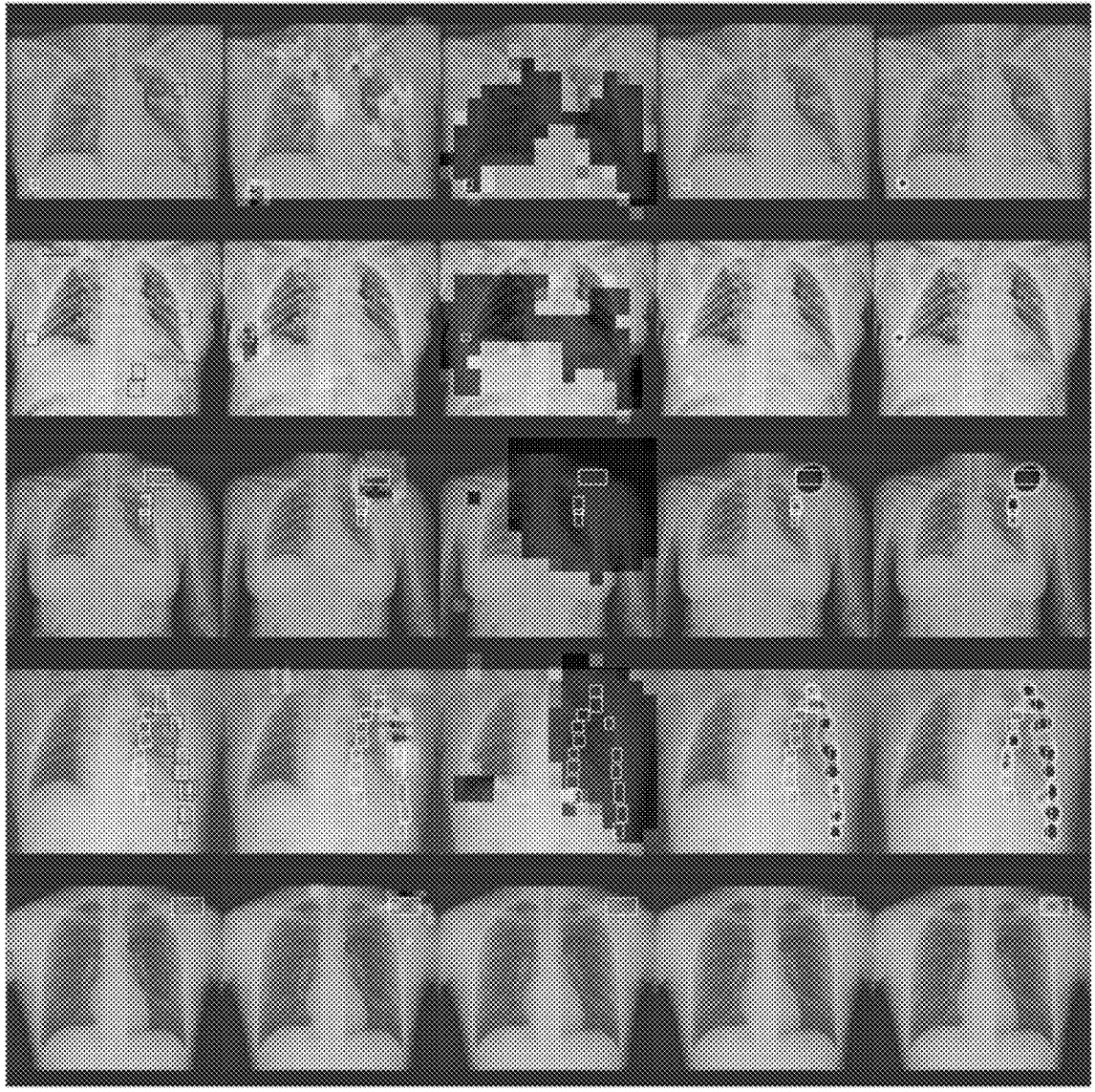
FIG. 6 illustrates examples of the fracture detection results according to various embodiments of the present disclosure.

In contrast with the disclosed methods, the baseline knowledge distillation methods treat the image-level positive images as unlabeled data. While weakly-supervised learning and multi-instance learning are effective on learning the simpler clavicle fractures, they are less effective on more complex rib fractures. In addition, CheXNet and Li-method also produce poor localization performances. CheXNet provides localization visualization via class activation maps (CAM). Since the CAM values are not comparable across images, the FROC cannot be calculated for CheXNet results. As Li-method consistently produces overly large activation areas, Li-method does not report meaningful FROC scores. For both CheXNet and Li-method, it was qualitatively verified that their localization performances are worse than other methods, as demonstrated by the examples of the fracture detection results shown in FIG. 6, where GT and FCOS detected fracture bounding-boxes are illustrated.

Example IV

The disclosed AALS was validated by conducting experiments with different sharpening strengths $A_0$ and centers T, respectively. First, to analyze the effect of the label sharpening center T, AALS was evaluated with T=0.2; 0.3; 0.4; and 0.5 and summarize the results in Table 2. Using T=0.4 achieved the best detection performance, measuring the highest/second highest AUROC score of 0.9318/0.9646, and the highest FROC score of 0.8914/0.9265, on rib/clavicle fracture detection.

TABLE 2

| | Rib fracture | | Clavicle fracture | |
|---|---|---|---|---|
| t | AUROC | FROC | AUROC | FROC |
| 0.2 | 0.9289 | 0.8902 | 0.9661 | 0.9236 |
| 0.3 | 0.9261 | 0.8888 | 0.9611 | 0.9168 |

TABLE 2-continued

|   | Rib fracture | | Clavicle fracture | |
| --- | --- | --- | --- | --- |
| t | AUROC | FROC | AUROC | FROC |
| 0.4 | 0.9318 | 0.8914 | 0.9646 | 0.9265 |
| 0.5 | 0.9271 | 0.8848 | 0.9577 | 0.9106 |

TABLE 3

|   | Rib fracture | | Clavicle fracture | |
| --- | --- | --- | --- | --- |
| $a_0$ | AUROC | FROC | AUROC | FROC |
| 1 | 0.9222 | 0.8783 | 0.9550 | 0.9036 |
| 4 | 0.9318 | 0.8914 | 0.9646 | 0.9265 |
| 8 | 0.9283 | 0.8884 | 0.9606 | 0.9090 |
| 16 | 0.9302 | 0.8911 | 0.9620 | 0.9185 |

Figure 4:
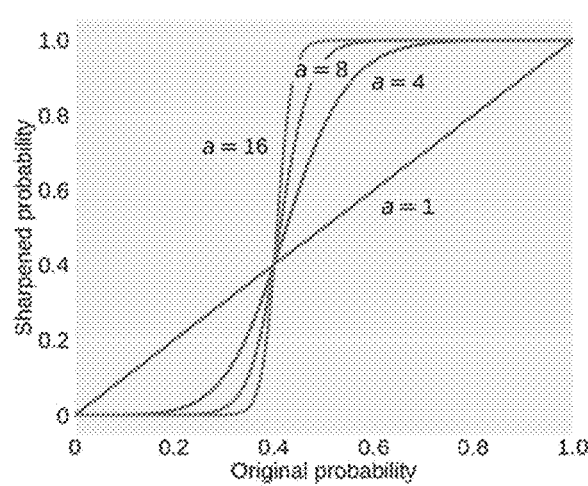
FIG. 4 illustrates asymmetric label sharpening function according to various embodiments of the present disclosure.

Note that for clavicle fracture classification, the best AUROC score of 0.9661 achieved at T=0.2 only marginally better than that of t=0.4. The sharpening center behaves as a trade-off between sensitivity and specificity. It was noted that the disclosed method consistently outperformed other baseline methods using all four T values. Second, impact of the sharpening strength was studied by fixing the center T=0.4 and evaluate $A_0$=1; 4; 8; 16, as shown in FIG. 4. As summarized in Table 3, label sharpening with strength $A_0$=4 resulted in the best detection performance. For $A_0$=1, no label sharpening was applied, which resulted in degraded performance. For $A_0$=8; 16, the label sharpening becomes overly aggressive (as shown in FIG. 4), which also causes false positives in sharpened pseudo GTs and hence slight performance degradation.

Figure 5:
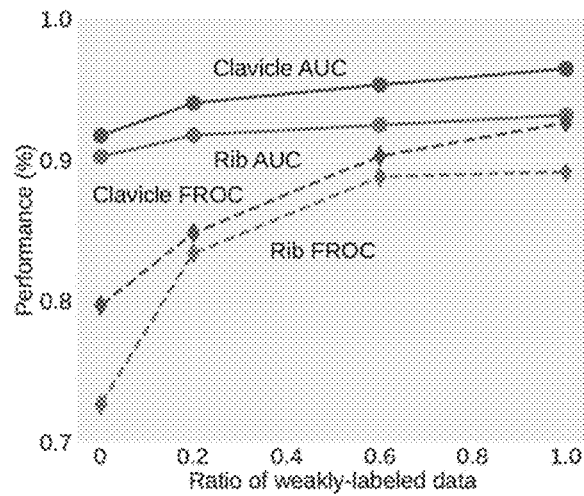
FIG. 5 illustrates model performance using a subset of image-level diagnostic positive images according to various embodiments of the present disclosure.

The involvement of image-level positive set P was further studied. FIG. 5 shows the classification and detection performances for rib and clavicle using a subset of P with different ratios (0%, 20%, 60%, 100%), where 0% and 100% correspond to the supervised pre-training student model and the disclosed method, respectively. It was observed that larger P improves both the classification AUROC and detection FROC scores. This verified that CAD model training can benefit from utilizing image-level labels from clinical diagnoses.

Although the principles and implementations of the present disclosure are described by using exemplary embodiments in the specification, the foregoing descriptions of the embodiments are only intended to help understand the method and core idea of the method of the present disclosure. Meanwhile, a person of ordinary skill in the art may make modifications to the specific implementations and application range according to the idea of the present disclosure. In conclusion, the content of the specification should not be construed as a limitation to the present disclosure.

What is claimed is:

1. A knowledge distillation method for fracture detection, comprising:
obtaining medical images including region-level labeled images, image-level diagnostic positive images, and image-level diagnostic negative images, in chest X-rays;
performing a supervised pre-training process on the region-level labeled images and the image-level diagnostic negative images to train a neural network to generate pre-trained weights;
performing a semi-supervised training process on the image-level diagnostic positive images using the pre-trained weights, wherein a teacher model is employed to produce pseudo ground-truths (GTs) on the image-level diagnostic positive images for supervising training of a student model, and the pseudo GTs are processed by an adaptive asymmetric label sharpening (AALS) operator to produce sharpened pseudo GTs to provide positive detection responses on the image-level diagnostic positive images;
in the semi-supervised training process, training the student model via back propagation and iteratively updating the teacher model using an exponential moving average (EMA) of weights of the student model during training, wherein weights of the teacher model are updated by:

$$\theta'_t = \alpha \theta'_{t-1} + (1-\alpha)\theta_t$$

wherein $\theta'_t$ and $\theta_t$ respectively denote the weights of the teacher model and the student model at a training step t, and a is a smoothing coefficient to control a pace of knowledge update; and
processing the pseudo GTs produced by employing the teacher model on the image-level diagnostic positive images in the AALS operator to generate sharpened pseudo GTs, wherein the sharpened pseudo GTs of an image x includes:

$$y' = S(f_{\theta'_t}(x))$$

wherein y' denotes the sharpened pseudo GTs, $f_{\theta'_t}$ denotes the teacher model at step t, and S(·) denotes adaptive asymmetric label sharpening (AALS).

2. The method according to claim 1, wherein performing the supervised pre-training process includes:
for the region-level labeled images, generating GT masks by assigning "one" to pixels within labeled bounding-boxes and assigning "zero" elsewhere;
for the image-level diagnostic negative images, generating GT masks with all "zeros;" and
using a same supervised loss for the supervised pre-training process on the region-level labeled images and the image-level diagnostic negative images.

3. The method according to claim 2, wherein:
the same supervised loss includes a pixel-wise binary cross-entropy (BCE) loss ($L_{sup}$), wherein:

$$\mathcal{L}_{sup} = \sum_{x \in (R \cup N)} BCE(f_\theta(x), y)$$

x denotes the region-level labeled images or the image-level diagnostic negative images,
y denotes a pixel-level supervision mask corresponding to X, and
$f_\theta(x)$ denotes probability map output of the neural network parameterized by $\theta$.

4. The method according to claim 1, further including:
initializing each of the teacher and student models using the pre-trained weights generated from the supervised pre-training process.

5. The method according to claim 1, wherein:
an KL divergence between the sharpened pseudo GTs and student model's prediction $f_{\theta_t}(x)$ is calculated as an additional loss ($L_{semi}$):

$$\mathcal{L}_{semi} = \sum_{x=\mathcal{P}} KLDiv\big(S(f_{\theta'_t}(x)), f_{\theta_t}(x)\big),$$

and
a total loss (L) used to train the student network includes:

$$\mathcal{L} = \mathcal{L}_{sup} + \mathcal{L}_{semi}.$$

6. The method according to claim 1, wherein:
the image-level diagnostic positive images contain visible fracture sites; and
the AALS on the image-level diagnostic positive images includes:

$$y' = S(y) = expit(A \cdot logit(y) + (1-A) \cdot logit(T)),$$

wherein expit(·) and logit(·) denote Sigmoid function and inverse of the Sigmoid function, respectively, and A and T control sharpening strength and sharpening center of the AALS operator, respectively,
wherein:

$$A = A_0 - (A_0 - 1)y_{max},$$

$y_{max}$ is a maximum probability in the pseudo GTs, and $A_0$ is a hyperparameter that controls largest sharpening strength that is allowed.

7. The method according to claim 6, further including:
selecting a dynamic sharpening strength A for an asymmetric sharpening and selecting the sharpening center of less than 0.5.

8. An electronic device, comprising:
a memory, containing computer program stored thereon; and
a processor, coupled with the memory and, when the computer program being executed, configured to:
obtain medical images including region-level labeled images, image-level diagnostic positive images, and image-level diagnostic negative images, in chest X-rays;
perform a supervised pre-training process on the region-level labeled images and the image-level diagnostic negative images to train a neural network to generate pre-trained weights;
perform a semi-supervised training process on the image-level diagnostic positive images using the pre-trained weights, wherein a teacher model is employed to produce pseudo ground-truths (GTs) on the image-level diagnostic positive images for supervising training of a student model, and the pseudo GTs are processed by an adaptive asymmetric label sharpening (AALS) operator to produce sharpened pseudo GTs to provide positive detection responses on the image-level diagnostic positive images;
in the semi-supervised training process, train the student model via back propagation and iteratively update the teacher model using an exponential moving average (EMA) of weights of the student model during training, wherein:
weights of the teacher model are updated by:

$$\theta'_t = \alpha\theta'_{t-1} + (1-\alpha)\theta_t$$

wherein $\theta'_t$ and $\theta_t$ respectively denote the weights of the teacher model and the student model at a training step t, and α is a smoothing coefficient to control a pace of knowledge update; and
process the pseudo GTs produced by employing the teacher model on the image-level diagnostic positive images in the AALS operator to generate sharpened pseudo GTs, wherein the sharpened pseudo GTs of an image x includes:

$$y' = S(f_{\theta'_t}(x))$$

wherein y' denotes the sharpened pseudo GTs, $f_{\theta'_t}$ denotes the teacher model at step t, and S() denotes adaptive asymmetric label sharpening (AALS).

9. The device according to claim 8, wherein in the supervised pre-training process, the processor is further configured to:
use a same supervised loss for the supervised pre-training process on the region-level labeled images and the image-level diagnostic negative images, wherein:
the same supervised loss includes a pixel-wise binary cross-entropy (BCE) loss ($L_{sup}$), wherein:

$$\mathcal{L}_{sup} = \sum_{x \in (\mathcal{R} \cup \mathcal{N})} BCE(f_\theta(x), y)$$

x denotes the region-level labeled images or the image-level diagnostic negative images,
y denotes a pixel-level supervision mask corresponding to X, and
$f_\theta(x)$ denotes probability map output of the neural network parameterized by θ.

10. The device according to claim 8, wherein the processor is further configured to:
initialize each of the teacher and student models using the pre-trained weights generated from the supervised pre-training process.

11. The device according to claim 8, wherein:
an KL divergence between the sharpened pseudo GTs and student model's prediction $f_{\theta_t}(x)$ is calculated as an additional loss ($L_{semi}$):

$$\mathcal{L}_{semi} = \sum_{x=\mathcal{P}} KLDiv\big(S(f_{\theta'_t}(x)), f_{\theta_t}(x)\big),$$

and
a total loss (L) used to train the student network includes:

$$\mathcal{L} = \mathcal{L}_{sup} + \mathcal{L}_{semi}.$$

12. The method according to claim 8, wherein:
the image-level diagnostic positive images contain visible fracture sites; and
the AALS on the image-level diagnostic positive images includes:

$$y' = S(y) = expit(A \cdot logit(y) + (1 - A) \cdot logit(T)),$$

wherein expit(·) and logit(·) denote Sigmoid function and inverse of the Sigmoid function, respectively, and A and T control sharpening strength and sharpening center of the AALS operator, respectively, wherein:

$$A = A_0 - (A_0 - 1)y_{max},$$

$y_{max}$ is a maximum probability in the pseudo GTs, and $A_0$ is a hyperparameter that controls largest sharpening strength that is allowed.

13. A computer program product comprising a non-transitory computer-readable storage medium and program instructions stored therein, the program instructions being configured to be executable by a computer to cause the computer to implement operations comprising:
obtaining medical images including region-level labeled images, image-level diagnostic positive images, and image-level diagnostic negative images, in chest X-rays;
performing a supervised pre-training process on the region-level labeled images and the image-level diagnostic negative images to train a neural network to generate pre-trained weights;
performing a semi-supervised training process on the image-level diagnostic positive images using the pre-trained weights, wherein a teacher model is employed to produce pseudo ground-truths (GTs) on the image-level diagnostic positive images for supervising training of a student model, and the pseudo GTs are processed by an adaptive asymmetric label sharpening (AALS) operator to produce sharpened pseudo GTs to provide positive detection responses on the image-level diagnostic positive images, wherein:
an KL divergence between the sharpened pseudo GTs and student model's prediction $f_{\theta_t}(x)$ is calculated as an additional loss ($L_{semi}$):

$$\mathcal{L}_{semi} = \sum_{x=\mathcal{P}} KLDiv(S(f_{\theta'_t}(x)), f_{\theta_t}(x)),$$

and
a total loss (L) used to train the student network includes:

$$\mathcal{L} = \mathcal{L}_{sup} + \mathcal{L}_{semi},$$

wherein $f_{\theta'_t}$ denotes the teacher model at step t, and S(·) denotes adaptive asymmetric label sharpening (AALS).

14. The product according to claim 13, wherein performing the supervised pre-training process includes:
using a same supervised loss for the supervised pre-training process on the region-level labeled images and the image-level diagnostic negative images, wherein:
the same supervised loss includes a pixel-wise binary cross-entropy (BCE) loss ($L_{sup}$), wherein:

$$\mathcal{L}_{sup} = \sum_{x \in (\mathcal{R} \cup \mathcal{N})} BCE(f_\theta(x), y)$$

x denotes the region-level labeled images or the image-level diagnostic negative images,
y denotes a pixel-level supervision mask corresponding to X, and
$f_\theta(x)$ denotes probability map output of the neural network parameterized by θ.

15. The product according to claim 13, wherein:
the image-level diagnostic positive images contain visible fracture sites; and
the AALS on the image-level diagnostic positive images includes:

$$y' = S(y) = expit(A \cdot logit(y) + (1 - A) \cdot logit(T)),$$

wherein expit(·) and logit(·) denote Sigmoid function and inverse of the Sigmoid function, respectively, and A and T control sharpening strength and sharpening center of the AALS operator, respectively, wherein:

$$A = A_0 - (A_0 - 1)y_{max},$$

$y_{max}$ is a maximum probability in the pseudo GTs, and $A_0$ is a hyperparameter that controls largest sharpening strength that is allowed.

16. The product according to claim 13, wherein the computer is further configured to perform:
in the semi-supervised training process, training the student model via back propagation and iteratively updating the teacher model using an exponential moving average (EMA) of weights of the student model during training, wherein:
weights of the teacher model are updated by:

$$\theta'_t = \alpha \theta'_{t-1} + (1 - \alpha)\theta_t$$

wherein $\theta'_t$ and $\theta_t$ respectively denote the weights of the teacher model and the student model at a training step t, and α is a smoothing coefficient to control a pace of knowledge update.

17. The product according to claim 13, wherein the computer is further configured to perform:
processing the pseudo GTs produced by employing the teacher model on the image-level diagnostic positive images in the AALS operator to generate sharpened pseudo GTs, wherein the sharpened pseudo GTs of an image x includes:

$$y' = S(f_{\theta'_t}(x))$$

wherein y' denotes the sharpened pseudo GTs, $f_{74_t'}$ denotes the teacher model at step t, and $S(\cdot)$ denotes adaptive asymmetric label sharpening (AALS).

\* \* \* \* \*